United States Patent Office 3,052,739
Patented Sept. 4, 1962

3,052,739
CATALYST FOR USE IN CONVERTING
HYDROCARBONS
William S. Hummers, Jr., Charleston, S.C., assignor to American Metal Climax, Inc., New York, N.Y., a corporation of New York
No Drawing. Filed Mar. 30, 1959, Ser. No. 802,627
12 Claims. (Cl. 260—668)

The present invention relates to a catalyst which may be used to accelerate the conversion of one hydrocarbon to another under the influence of heat and pressure.

Hydrocarbon compounds when subject to heat and pressure may be changed or modified in various ways. For example, large molecules may be broken down into smaller molecules under heat and pressure, this action being referred to as "cracking." Other forms of conversion include what are known as "dehydrogenating," "hydrogenating," "isomerization," "cyclization" and "reforming." Hydrogenation and dehydrogenation involve the conversion of a hydrocarbon compound to one having more or less hydrogen atoms, and those changes occur under appropriate conditions of pressure and temperature in the presence of hydrogen. Reforming involves the change from one type of molecule to another, and is used, for example, to increase the octane rating of gasoline by increasing the percentage of aromatic compounds. This reaction also involves dehydrogenation. These conversions are usually reversible. For example, in the presence of hydrogen, a hydrocarbon compound will be hydrogenated at high pressure and moderate temperature, but the reverse reaction will occur at high temperature and low pressure. The same is true of the conversion of straight chain to cyclical or aromatic compounds.

The speed of any of the foregoing conversions is greatly enhanced by the presence of a catalyst and it is well known that almost any metal or metal oxide will have some catalytic effect. Molybdenum is one of the metals that has been used in a catalyst, but the only type of molybdenum-containing catalyst which has been sufficiently effective in hydrocarbon conversion reactions to enjoy commercial success is a molybdenum oxide supported on another metal oxide, such as alumina. While catalysts of this type were once widely used, they are being replaced to a large degree by the more potent platinum catalyst, in which platinum is supported in a very thin layer on a porous metal oxide carrier, such as silica or alumina or both. It has been recognized that for a given gross volume of catalyst the catalytic action increases with an increase in the surface area of the catalyst. Accordingly, it is conventional practice to prepare prior catalysts in a finely divided and porous form having great surface area, for example, from 100 to 200 square meters per gram of material. This may be achieved by precipitation of metal compounds from a solution or by vapor deposition of a metal or its oxide on a porous carrier. Because of this structural form, both the prior molybdenum oxide and the platinum catalysts are subject to the defect that they are relatively fragile and have a low coefficient of thermal conductivity.

It is the object of the present invention to provide an improved catalyst in the form of granules of substantial strength which will resist being crushed to particles so fine that they will be carried along with the flow of materials being treated and which will have a relatively high thermal coefficient of conductivity so that they will avoid development of excessive temperature gradients within the catalyst particles and in the catalytic bed. While the catalyst of the present invention has much lower surface area for a given volume of catalyst bed than the prior molybdenum oxide and platinum catalysts, it has comparable catalytic effect for the same volume of catalyst bed and rate of flow of hydrogen and hydrocarbons.

The catalyst of the present invention comprises a mass of small solid particles of metallic molybdenum or of a molybdenum-aluminum alloy in a metallic state, the surface of the particles having been activated by treatments hereinafter described. An essential feature of the catalyst is that the interior of each particle contains unoxidized molybdenum metal.

The term "metallic" as used herein means a metal or metal alloy which is not in the form of an oxide, sulfide, chloride, or other compound, excepting only such intermetallic compounds as may form between the two metals of the alloy.

Aluminum not only reduces the weight and cost of the catalyst but has other effects which are advantageous for some purposes, as hereinafter set forth. The aluminum content may range from about 1% to about 33%.

The best results have been obtained with metallic molybdenum castings or molybdenum-aluminum alloy castings which are coarsely crystalline and which are sufficiently brittle so that they may be crushed to the desired particle size. The particles may be made by crushing solid bars made from sintered powdered metal, but in that case it may be necessary to chill the metal with Dry Ice or liquid air if it is too malleable to crush at room temperature. Good results have been obtained with particles in the form of chips or cuttings produced by machining molybdenum castings or bars. The term "castings" as used herein means metal which has solidified from a molten state.

The particles may be of any desired size within a wide range, but the catalyst is noteworthy in that it may be used in the form of larger solid, nonporous particles than prior catalysts, even though such particles offer far less surface area for a given volume of catalyst. For example, particles obtained by crushing molybdenum castings and having a size to pass a five-mesh and be retained on a seven-mesh screen, which would have a surface area of substantially less than one square meter per gram, give excellent results. Larger or substantially smaller particles may be used with similar results. Thus, the particles may range from those which will pass a three-mesh screen to particles having a size of about one micron, but it is preferred that the particles be no smaller than those which will be retained on a 325-mesh screen. The catalyst particles may be pellets each made up of a plurality of small particles sintered or otherwise bound together in a porous mass, and in that case it is also preferred that the individual particles of which each pellet is made be no smaller than a size which will just fail to pass a 325-mesh screen, which is approximately 50 microns. In addition, when particles of the smallest permissible size are used they should be solid, dense, and nonporous in character.

In any case the mental particles are treated to activate their surfaces without changing their interior character. This treatment includes exposing the particles to an oxidizing atmosphere at an elevated temperature, following which the catalyst is exposed to hydrogen at an elevated temperature. These treatments may be given the particles either before or after they are charged into the reaction chamber in which the hydrocarbon conversion is to take place. However, it is usually more convenient to give the hydrogen treatment after the catalyst is charged into the chamber, since otherwise it may be necessary to protect the catalyst from exposure to oxygen after the hydrogen treatment. It is believed that the oxygen treatment forms an oxide layer on the surface of each particle without oxidizing the metal particles to their centers and that the subsequent hydrogen treatment removes all or most of the oxygen from the surface layer.

In any event it is known that the effect of this treatment is to convert the surface to a highly active state. This is indicated by the fact that fairly coarse particles, if allowed to cool to room temperature after activation and then removed from the reaction chamber, will, on contact with the atmosphere, oxidize so rapidly that they will glow, whereas prior to the treatment they seemed unaffected by contact with the atmosphere. If the particles are fine powder particles they will ignite spontaneously on exposure to air.

The surface of the particles is oxidized by exposure to oxygen, air, or any mixture of relatively inert gases and free oxygen, at a temperature in the range of 400° C. to 600° C., and at atmospheric pressure or higher. In order to decrease the time required for oxidation it is preferred to employ a temperature of at least 500° C., and in order to minimize loss of catalyst by vaporization of $MoO_3$ it is preferred that the temperature not exceed 550° C. An oxidation treatment for one hour at 515° C. and atmospheric pressure is adequate for the larger sized particles, but shorter periods are necessary if the particles are so small that they are in danger of being completely oxidized. The minimum particle size which may be used is limited only by the difficulty of oxidizing the surface of each particle adequately without oxidizing substantially all of the particle. For this reason, the minimum particle size is preferably limited by practical considerations to solid nonporous particles larger than those which would pass a 325-mesh screen. However, the use of smaller particles is within the scope of the invention.

The oxidation step may be carried out after the particles are placed in the hydrocarbon conversion reaction chamber or prior thereto. If they are oxidized in the reaction chamber, the chamber must be cleared of oxygen after the oxidation treatment, preferably by flushing with helium or nitrogen before starting the hydrogen treatment.

The oxidized particles do not become fully effective as a hydrocarbon conversion catalyst until after they are activated by contact with hydrogen at an elevated temperature. However, in many conversion reactions free hydrogen is released and in others it is added or recirculated with the hydrocarbon to be treated. Consequently, particularly when the apparatus used is of the type involving the use of a moving bed of catalyst which passes through the reaction chamber, the newly charged particles may become activated during their passage through the chamber by the free hydrogen present. In that case they need not be given a preliminary hydrogen treatment. In other cases a very short preliminary hydrogen treatment will partially activate the catalyst and the activation treatment will continue during the conversion reaction as a result of the free hydrogen released during the reaction or otherwise combined with the hydrocarbon. In this case the catalytic activity will increase during the first part of the conversion reaction period.

If it is desired to activate the particles either partially or fully by a preliminary treatment it may be achieved by passing hydrogen or any gas containing free hydrogen as its principal constituent over the particles at a temperature between 350° C. and 700° C., and preferably between 500° C. and 550° C., and at atmospheric pressure or higher. This treatment need only be continued for a few minutes at temperatures around 500° C., but is preferably continued for one hour at a pressure of ten or more atmospheres prior to start of the hydrocarbon conversion process. Treatments with hydrogen may be continued for longer periods than one hour without undesirable results and such longer periods are preferable at temperatures below 500° C.

It has also been found that the catalyst of the present invention frequently improved progressively if subject to a series of cycles of activation. In several instances in which this procedure was followed with granules of a size between five- and seven-mesh, maximum performance was achieved after the fifth cycle of activation treatment in each cycle of which the catalyst was oxidized one hour at 515° C. and reduced for one hour at 490° C.

After the catalyst has been activated, the hydrocarbon flow over the catalyst may be started. At this time the pressure and temperature are adjusted to the proper levels for the type of conversion desired. The flow of hydrogen must be continued for certain types of dehydrogenation conversions and is preferably continued at least to some extent during all types of conversions to help maintain the activity of the catalyst. In performing dehydrogenating and other reforming operations, the pressures, temperatures, proportions of hydrogen to the hydrocarbon, and all of the other conditions may be any of those conventionally employed in commercial dehydrogenation and reforming of hydrocarbons with the type of catalyst which comprises molybdenum oxide on a carrier of aluminum or silica. The amount of hydrogen which is used with the raw material to effect dehydrogenating or other reforming operations is not critical and may vary between one and ten moles of hydrogen for each mole of the hydrocarbon to be treated. When the catalyst is used primarily for cracking purposes smaller amounts of hydrogen or none at all may be employed.

The catalyst of the present invention may be employed to accelerate any of the hydrocarbon conversion reactions for which the prior molybdena on alumina catalyst has been used.

A specific example of the catalyst of the present invention is a mass of metallic particles obtained by crushing a casting of substantially pure molybdenum, i.e., molybdenum containing no other elements except possibly small quantities of carbon and unavoidable impurities totalling less than 0.2%. The particles were graded to an approximately uniform size capable of passing a five-mesh screen but retained on a seven-mesh screen. The granular catalyst was activated by subjecting it to three cycles of treatment in each of which it was exposed to a flow of air at 515° C. at atmospheric pressure for one hour and thereafter by flowing free hydrogen over the catalyst for one hour at 515° C. at a pressure of thirty atmospheres.

The above specific example of the catalyst after such activation was employed to dehydrogenate methylcyclohexane to produce aromatic compounds. The methylcyclohexane together with commercially pure hydrogen at a ratio of six moles of hydrogen to one of methylcyclohexane was passed through a stationary bed of the granular catalyst at a temperature of 490° C., a pressure of ten atmospheres, and a space velocity of twenty volumes of liquid methylcyclohexane per hour per apparent volume of catalyst. The total liquid recovery was 95.2% of which 40.0% were aromatic hydrocarbons. Approximately 93% of the aromatic hydrocarbon was toluene and the balance benzene. Under the same conditions a prior commercially used molybdenum oxide on alumina catalyst gave a slightly higher liquid recovery but yielded less than one fourth as much aromatic hydrocarbon. This is considered very significant because the surface area of the commercial catalyst used was estimated to be approximately one hundred times that of the granular metallic catalyst of the present invention for the same apparent volume of catalyst.

The above catalyst example under the same conditions except for an increase in the pressure causes cracking of a larger portion of the hydrocarbon, which is evidenced by a lower liquid recovery, although an increased percentage of the liquid yield is aromatic. Thus, in one run feeding methylcyclohexane and hydrogen at thirty atmospheres, all other conditions remaining the same, the liquid recovery was 77.6% of which 46.7% was aromatic. The aromatic product was 85% toluene and the balance benzene. The somewhat greater amount of cracking is believed to be due in part to the fact that with the same liquid space velocity the contact time is longer at the higher pressure.

The same catalyst is effective to convert n-heptane to toluene. When n-heptane is combined with hydrogen and fed at a space velocity of twenty, a temperature of 490° C., and a pressure of thirty atmospheres, there was produced a liquid yield of 30.5% of which 9% was aromatic, approximately half and half toluene and benzene. Larger liquid returns are achieved at slower space velocities and lower pressures, but smaller yields of aromatics result.

A second example of the catalyst was prepared by crushing a bar of molybdenum which had been made by sintering finely powdered metal and thereafter hot rolling the sintered bar to produce a dense solid and nonporous metallic body. This example produced results substantially equivalent to those of the first example under the same conditions.

Another example of the molybdenum catalyst is one made up of very fine particles, ranging in size from about two to five microns in diameter, sintered into 1/8" pellets. This material is relatively light in weight and fragile as compared with the coarser solid particles but has much greater surface area for the same volume of material. Care must be exercised during the oxidation treatment to avoid complete oxidation. This catalyst, after being reduced for five hours at 650° C. and then oxidized fifteen minutes at 515° C. and reduced for an hour at 515° C., gave a liquid recovery at a pressure of ten atmospheres and a temperature of 490° C. of 75.4% of which 14.6% was benzene, 55.4% was toluene and 23.9% was methylcyclohexane. The higher yield here is believed due to the greater surface area of the catalyst. In this test the apparent volume of catalyst used was the same as in all other tests reported here and the space velocity was twenty.

Another example of the catalyst comprised granules of the same size and prepared in the same manner as the first example except from a casting of a molybdenum base alloy containing 6.9% aluminum. When methylcyclohexane is fed over this catalyst at a space velocity of twenty, a pressure of thirty atmospheres, a temperature of 490° C., and in combination with six moles of hydrogen for each mole of methylcyclohexane, the liquid recovery was 82.3% of which 50.3% was aromatic hydrocarbons. The aromatics were 87% toluene and the balance benzene. This contrasts with a liquid recovery of 95.7% of which 26.9% was aromatic when the prior commercial molybdenum oxide catalyst was used under the same conditions.

While the above specific molybdenum-aluminum alloy gave better results at thirty atmospheres than pure molybdenum of the same granule size did at any pressure, it was somewhat less productive than the pure molybdenum at ten atmospheres. Thus, at ten atmospheres pressure, at 490° C., and a space velocity of twenty, the above molybdenum-aluminum alloy catalyst resulted in a recovery of 95.9% liquid of which 25.94% was aromatic. The data indicate that at all pressures the aluminum present reduced the amount of cracking, thus increasing the total yield of aromatics at the higher pressures where the liquid yield of the pure molybdenum catalyst was low, even though the percentage of aromatics in the recovered liquid using the alloy was slightly lower in all cases. However, molybdenum-aluminum alloys containing 10% aluminum have not been found to be superior in catalytic activity to pure molybdenum.

The molybdenum-aluminum alloy catalyst is also effective to convert n-heptane to toluene. Thus, when a mixture of n-heptane and hydrogen was passed over the specific alloy catalyst containing 6.9% aluminum at a space velocity of eight, a temperature of 490° C., and a pressure of thirty atmospheres, the liquid yield was 35.6% of which 10.8% was aromatic hydrocarbons. The aromatic hydrocarbons were 72% toluene and the balance benzene.

In the catalytic conversions of methylcyclohexane referred to above the nonaromatic liquid recovered was largely methylcyclohexane, so it is apparent that higher yield of aromatic liquids can be realized by recycling or by longer treatments.

Comparable results can be obtained with particles prepared from molybdenum-aluminum alloys in which the alloy content ranged from about 1% up to about 33%. Specific examples of these alloys include those containing 2%, 6.9%, 10.17%, 21.9% and 33% aluminum, respectively, the balance of the alloy in each case consisting of molybdenum.

In all of the data given above the percentages of the various components of the recovered liquid are given in terms of the recovered liquid as 100% and not as percentages of the starting material. Thus, if the liquid recovery was 50% of which 50% was aromatic, then the aromatic recovery is 25% of the starting material.

The above mentioned molybdenum alloy containing 6.9% aluminum after oxidation and reduction at 515° C. for one hour each was used to upgrade the octane rating of a specimen of commercial petroleum fraction of the type which was currently being treated under comparable conditions in the presence of a platinum catalyst. The raw material comprised a desulfurized Mid-Continent gas oil fraction having a boiling point between 33° C. and 206° C. and containing some products obtained by cracking heavier crude fractions. It had a research octane rating of 65, F-1 clear. It was combined with hydrogen at the ratio of six moles of hydrogen to each mole of the raw material (calculated on the arbitrary assumption that the raw material was 100% methylcyclohexane) and passed over the molybdenum-aluminum catalyst at a pressure of thirty atmospheres, a temperature of 490° C., and at a space velocity of six volumes of liquid petroleum fraction per hour per volume of catalyst. The resulting product had a research octane rating of 88, F-1 clear, and a Reid vapor pressure of 12.6 pounds per square inch.

As in the case of all catalysts, the conditions of use may be varied widely depending upon the hydrocarbons to be treated and the results desired; and no claim is made to the discovery of any novel or different methods or conditions of use. Under some conditions and for some purposes any catalyst may cause too severe a reaction, in which event it is necessary to increase the space velocity (i.e., decrease the contact time), or decrease the temperature of the reaction or modify the pressure. For example, if the objective is to obtain the maximum yield of aromatics from methylcyclohexane using a pure molybdenum catalyst, the above data indicate that this is better achieved at a pressure of ten atmospheres than at thirty. But if the objective is to perform a cracking function at the same time that a conversion to aromatics is effected, then the higher pressure is preferable. If for some reason it is desired to perform the conversion of methylcyclohexane to toluene at thirty atmospheres with a minimum of cracking, then the molybdenum-aluminum alloy catalyst containing about 7% aluminum could be used to advantage. The use of higher pressures in this case might be dictated by other factors such as, for example, the fact that the raw material also contained n-heptane and a conversion of that compound was desired.

The importance of the new catalyst is that while having evident catalytic properties generally comparable to those of prior commercial catalysts, it is in a novel physical and chemical form which facilitates its use in catalyst beds of the fixed, moving or fluidized bed type or in other ways. In that connection the fact that it is made up of a mass of metallic granules which are hard, dense and strong greatly facilitates handling and minimizes objectionable fracturing, powdering, and packing. At the same time the granules have a much higher coefficient of thermal conductivity than the porous, high surface area catalysts hitherto used. This is important because the conversion reactions are either exothermic or endothermic and it is important to keep the temperature of the catalyst bed as nearly uniform throughout as is possible and also to minimize local hot or cold spots on the particles. The surprising feature of the catalyst is that it seems to have a catalytic effect for a given surface area which is in the order of one hundred times that of prior molybdenum-containing catalysts.

Another important advantage of the improved catalyst is that if it becomes fouled by carbon or coke it may be regenerated at high temperature by passing air or oxygen over the catalyst without fear of losing the activated surface layer, because the active surface may always be recreated from the base metal of each particle. This virtue is realized to a greater extent as the particle sizes increase. This contrasts with other commercial catalysts which are damaged by high temperatures and thus require careful control to avoid overheating during the burn off of coke.

In the appended claims when it is stated that the alloy consists essentially of molybdenum or an alloy of molybdenum and aluminum, it will be understood that the metallic catalysts defined may contain minor quantities of other elements so long as their presence does not materially impair or otherwise change the character of the catalytic action of the molybdenum.

What is claimed is:

1. A catalyst for hydrocarbon conversion reactions consisting of a mass of particles having a surface area of less than about 1 square meter per gram each of which consists essentially of metal from the group consisting of metallic molybdenum and a metallic alloy containing from about 1% to about 33% aluminum and the balance molybdenum, the surface of each particle having been activated by oxidizing the surface by exposure to an oxygen containing gas at an elevated temperature without oxidizing the entire particle and a subsequent exposure to a hydrogen containing gas at a temperature between 350° C. and 700° C.

2. A catalyst for hydrocarbon conversion reactions consisting of a mass of particles having a surface area of less than about 1 square meter per gram each of which consists essentially of metallic molybdenum, the surface of each particle having been activated by oxidizing the surface by exposure to an oxygen containing gas at an elevated temperature without oxidizing the entire particle and a subsequent exposure to a hydrogen containing gas at a temperature between 350° C. and 700° C.

3. A catalyst for hydrocarbon conversion reactions consisting of a mass of particles of metallic alloy having a surface area of less than about 1 square meter per gram containing from about 1% to about 33% aluminum and the balance consisting essentially of molybdenum, the surface of each particle having been activated by oxidizing the surface by exposure to an oxygen containing gas at an elevated temperature without oxidizing the entire particle and a subsequent exposure to a hydrogen containing gas at a temperature between 350° C. and 700° C.

4. A catalyst for hydrocarbon conversion reactions consisting of a mass of particles having a surface area of less than about 1 square meter per gram each of which consists essentially of metal from the group consisting of molybdenum and an alloy containing from about 1% to about 33% aluminum and the balance molybdenum, the surface of each particle having been activated by oxidizing the surface by exposure to an oxygen containing gas at an elevated temperature and a subsequent exposure to a hydrogen containing gas at a temperature between 500° C. and 550° C.

5. A catalyst for hydrocarbon conversion reactions consisting of a mass of particles having a surface area of less than about 1 square meter per gram each of which consists essentially of metallic molybdenum, the surface of each particle having been activated by oxidizing the surface by exposure to a relatively inert gas containing free oxygen at an elevated temperature and a subsequent exposure to a gas containing hydrogen as a principal constituent at a temperature between 500° C. and 550° C.

6. A catalyst for hydrocarbon conversion reactions consisting of a mass of particles of a metallic alloy having a surface area of less than about 1 square meter per gram containing from about 1% to about 33% aluminum and the balance consisting essentially of molybdenum, the surface of each particle having been activated by oxidizing the surface by exposure to a relatively inert gas containing free oxygen at an elevated temperature and a subsequent exposure to a gas containing hydrogen as a principal constituent at a temperature between 500° C. and 550° C.

7. A catalyst for hydrocarbon conversion reactions consisting of a mass of particles having a surface area of less than about 1 square meter per gram each of which consists essentially of metal solidified from the molten state and from the group consisting of molybdenum and an alloy containing from about 1% to about 33% aluminum and the balance consisting essentially of molybdenum, the surface of each particle having been activated by oxidizing the surface by exposure to an oxygen containing gas at an elevated temperature without oxidizing the entire particle and a subsequent exposure to a hydrogen containing gas at a temperature between 350° C. and 700° C.

8. A catalyst for hydrocarbon conversion reactions consisting of a mass of particles having a surface area of less than about 1 square meter per gram each of which consists essentially of metallic molybdenum solidified from a molten state, the surface of each particle having been activated by oxidizing the surface by exposure to an oxygen containing gas at an elevated temperature without oxidizing the entire particle and a subsequent exposure to a hydrogen containing gas at a temperature between 350° C. and 700° C.

9. A catalyst for hydrocarbon conversion reactions consisting of a mass of particles of metallic alloy solidified from the molten state having a surface area of less than about 1 square meter per gram and containing from about 1% to about 33% aluminum and the balance consisting essentially of molybdenum, the surface of each particle having been activated by oxidizing the surface by exposure to an oxygen containing gas at an elevated temperature without oxidizing the entire particle and a subsequent exposure to a hydrogen containing gas at a temperature between 350° C. and 700° C.

10. The method of converting a hydrocarbon liquid which comprises subjecting said hydrocarbon at conversion temperature to the action of a hydrocarbon conversion catalyst consisting of a mass of solid metallic particles having a surface area of less than about 1 square meter per gram consisting essentially of metal from the group consisting of molybdenum and an alloy containing 1% to 33% aluminum and the balance molybdenum, each particle having an unoxidized interior and an activated surface layer formed by oxidizing only the surface and thereafter at least partially reducing the same by the action of a hydrogen containing gas at an elevated temperature.

11. The method of making a catalyst suitable for catalyzing hydrocarbon conversion reactions comprising the steps of providing a mass of metallic particles having a surface area of less than about 1 square meter per gram consisting essentially of a metal selected from the group consisting of metallic molybdenum and a metallic alloy containing from about 1% to about 33% aluminum and the balance molybdenum, oxidizing said metallic particles by subjecting them at an elevated temperature to a gas containing free oxygen for a period of time sufficient to oxidize the surfaces thereof and retaining an unoxidized metallic core, and thereafter reducing the oxidized said metallic particles by subjecting them to a hydrogen containing gas at a temperature ranging from about 350° C. to about 700° C.

12. The method of making a catalyst suitable for catalyzing hydrocarbon conversion reactions comprising the steps of providing a mass of metallic particles having a particle size ranging from about 3 mesh to about 1 micron having a surface area of less than about 1 square meter per gram and consisting essentially of a metal selected from the group consisting of metallic molybdenum and a metallic alloy containing from about 1% to about 33% aluminum and the balance molybdenum, oxidizing said metallic particles by subjecting them to a temperature ranging from about 400° C. to about 600° C. to a gas containing free oxygen for a period of time sufficient to oxidize the surfaces thereof and retaining an unoxidized metallic core, and thereafter reducing the oxidized said metallic particles by subjecting them to a hydrogen containing gas at a temperature ranging from about 350° C. to about 700° C.

References Cited in the file of this patent

UNITED STATES PATENTS

| | | |
|---|---|---|
| 2,088,214 | Pfirrman | July 27, 1937 |
| 2,817,626 | Mabry et al. | Dec. 24, 1957 |
| 2,897,135 | Doumani | July 28, 1959 |